US012800423B2

(12) United States Patent
Meza et al.

(10) Patent No.: US 12,800,423 B2
(45) Date of Patent: Nov. 17, 2026

(54) SCALABLE AND COMPOSABLE FLEX LEAK SENSOR SHEET

(71) Applicant: Dell Products L.P., Round Rock, TX (US)

(72) Inventors: Abigail Meza, Round Rock, TX (US); Emily Clark, Round Rock, TX (US); Sandor Farkas, Round Rock, TX (US); Michael J. Stumpf, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 287 days.

(21) Appl. No.: 18/790,720

(22) Filed: Jul. 31, 2024

(65) Prior Publication Data

US 2026/0036484 A1 Feb. 5, 2026

(51) Int. Cl.
*G01M 3/16* (2006.01)

(52) U.S. Cl.
CPC .................................... *G01M 3/16* (2013.01)

(58) Field of Classification Search
CPC ................................ G01M 3/16; G01M 3/165
See application file for complete search history.

(56) References Cited

U.S. PATENT DOCUMENTS

2019/0162625 A1* 5/2019 Carr ...................... G01M 3/165
2020/0188161 A1* 6/2020 Seres ...................... A61F 5/445
2025/0076149 A1* 3/2025 Naivelt .................. G01M 3/38

* cited by examiner

*Primary Examiner* — Thomas M Hammond, III
(74) *Attorney, Agent, or Firm* — Fogarty LLP

(57) ABSTRACT

A scalable and composable flex leak sensor sheet composed of individual sensor tiles arranged in a matrix pattern. Each sensor tile features multiple redundant connections, ensuring functionality even if some traces are damaged. The sensor sheet is bendable and foldable, allowing the sensor sheet to conform to various shapes and sizes. The sensor tiles employ electrical traces on a flexible Printed Circuit Board (PCB). The sensor sheet can be cut into various shapes and connected to form larger composite structures. The first set of traces is located on the top side of the flexible PCB, and the second set of traces is located on the back side. The sensor sheet detects the presence of liquid by changing electrical properties when in contact with the liquid. The sensor tiles can be cut on three sides while maintaining electrical connectivity and functionality through the redundant connections.

20 Claims, 11 Drawing Sheets

SCALABLE AND COMPOSABLE FLEX LEAK SENSOR SHEET

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. IHS's may assume different form factors including, but not limited to: servers, workstations, desktops, laptops, appliances, video game consoles, tablets, smartphones, etc. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise blade servers that are stacked and installed within computing racks, which may also be referred to as racks. A data center may include large numbers of such computing racks that are organized into rows of racks. Administration of such large groups of IHSs may require teams of remote and local administrators working in shifts in order to support around-the-clock availability of the data center operations while minimizing any downtime.

Racks provide a means for densely housing relatively large numbers of individual computing devices. A principal challenge with such dense packaging often involves providing sufficient cooling for each of the computing devices. Many newer computing rack designs have implemented liquid cooling systems, such as liquid immersion cooling, or liquid cooling provided by cold plates that are thermally coupled to the principal heat-generating components of the individual computing device.

SUMMARY

Embodiments are directed to a scalable and composable flex leak sensor sheet with a unique design and functionality that address several limitations of existing leak detection technologies. The sensor sheet is composed of individual sensor tiles that can be connected together to form larger composite structures. This composable nature allows for extensive coverage and enhanced leak detection capabilities on larger projects without the need for custom designs for each new use case. The sensor sheet is bendable, foldable, adaptable, and mechanically tolerant, enabling it to conform to various shapes and sizes. This flexibility allows the sensor sheet to be cut into almost any shape and still function effectively, making it suitable for a wide range of applications and environments. Each sensor tile features redundant connections, allowing most its sides to be cut while still maintaining functionality. This redundancy ensures that the resilient sensor sheet remains operational even if some traces are damaged, providing high tolerance to mechanical stress.

The sensor sheet can be quickly prototyped and adapted to new projects or platforms using die-cutting techniques. This rapid custom fabrication capability allows for quick response to market demands and the creation of custom solutions in the lab for testing and evaluation. The sensor sheet provides greater coverage and sensitivity compared to traditional leak detection methods, such as leak detection ropes. The ability to cut the sheet into patterns and place it around components ensures maximum coverage and effective leak detection. The sensor sheet can be configured to provide both leak detection and structural benefits. It can be folded into tray structures for leak containment or into shield structures to protect sensitive components from splashes and electric fields while simultaneously sensing for leaks. These features collectively provide a versatile, cost-effective, and highly reliable solution for leak detection in various applications, particularly in data center environments where liquid cooling systems are used.

BRIEF DESCRIPTION OF THE DRAWINGS

Figure 1:
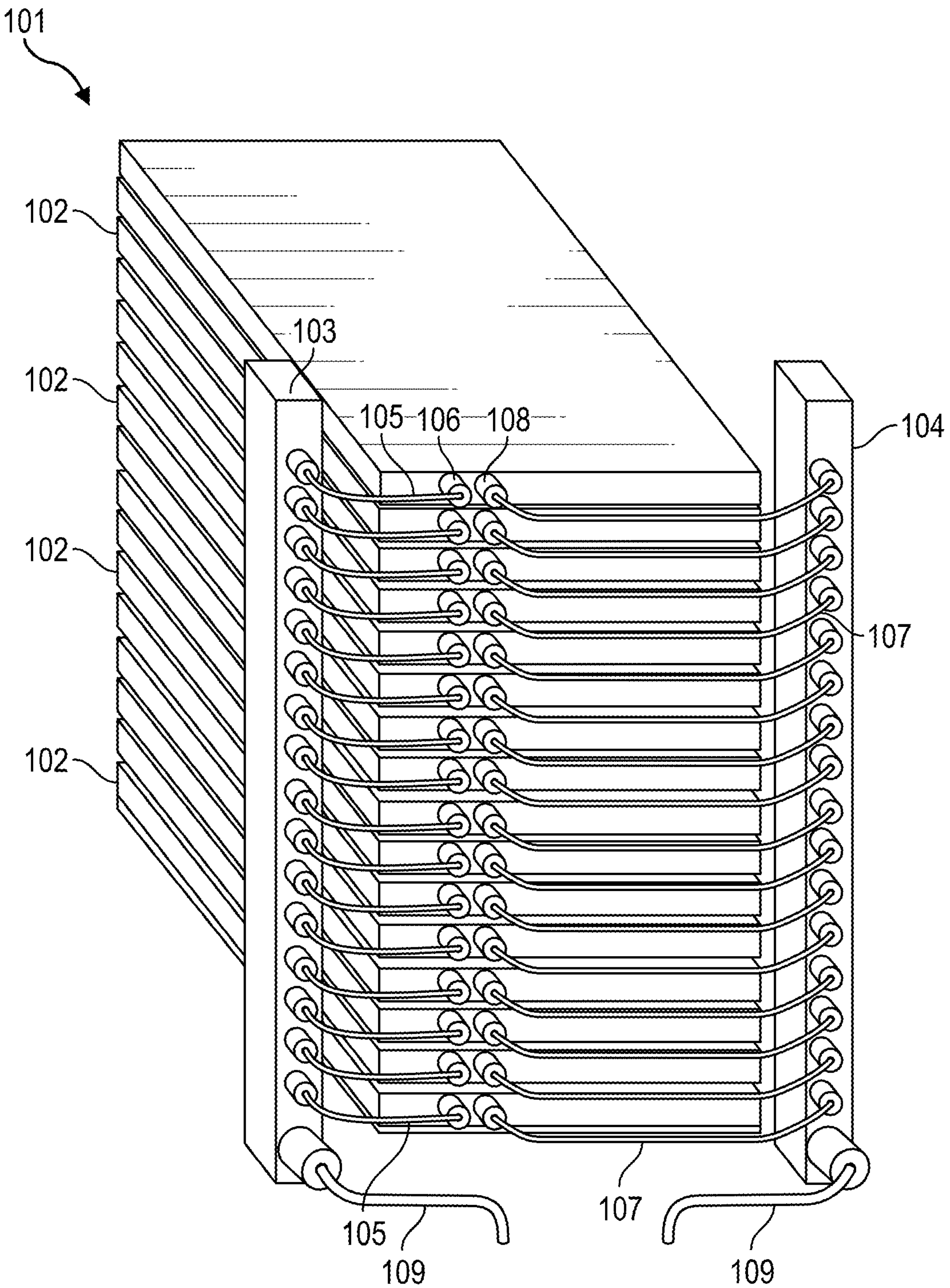

Having thus described the invention in general terms, reference will now be made to the accompanying drawings, which are not necessarily drawn to scale, and wherein:

FIG. 1 illustrates components of a liquid cooling system for a data center rack.

Figure 2:
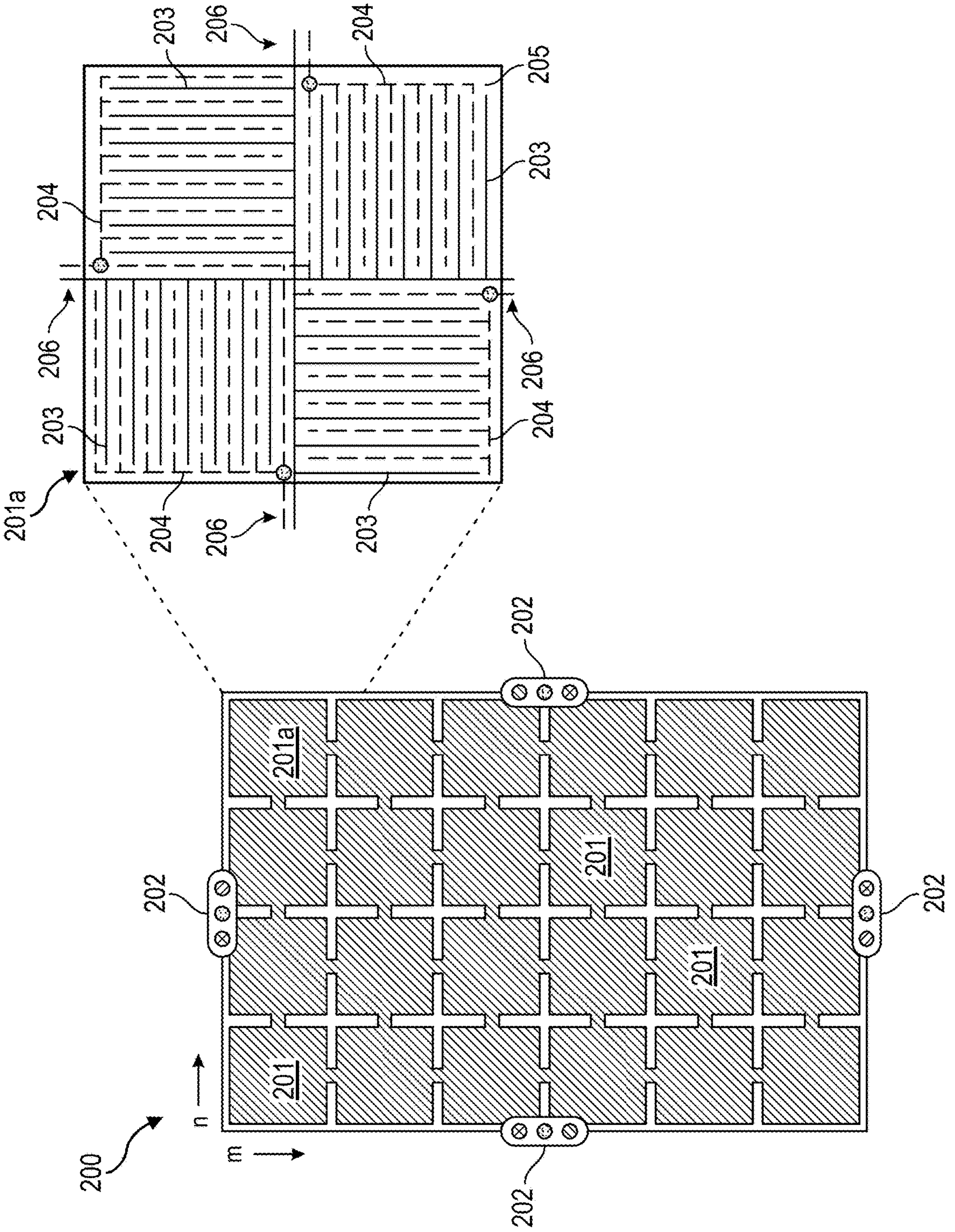

FIG. 2 illustrates an example flex leak sensor sheet comprising an n×m array of sensor tiles.

Figure 3:
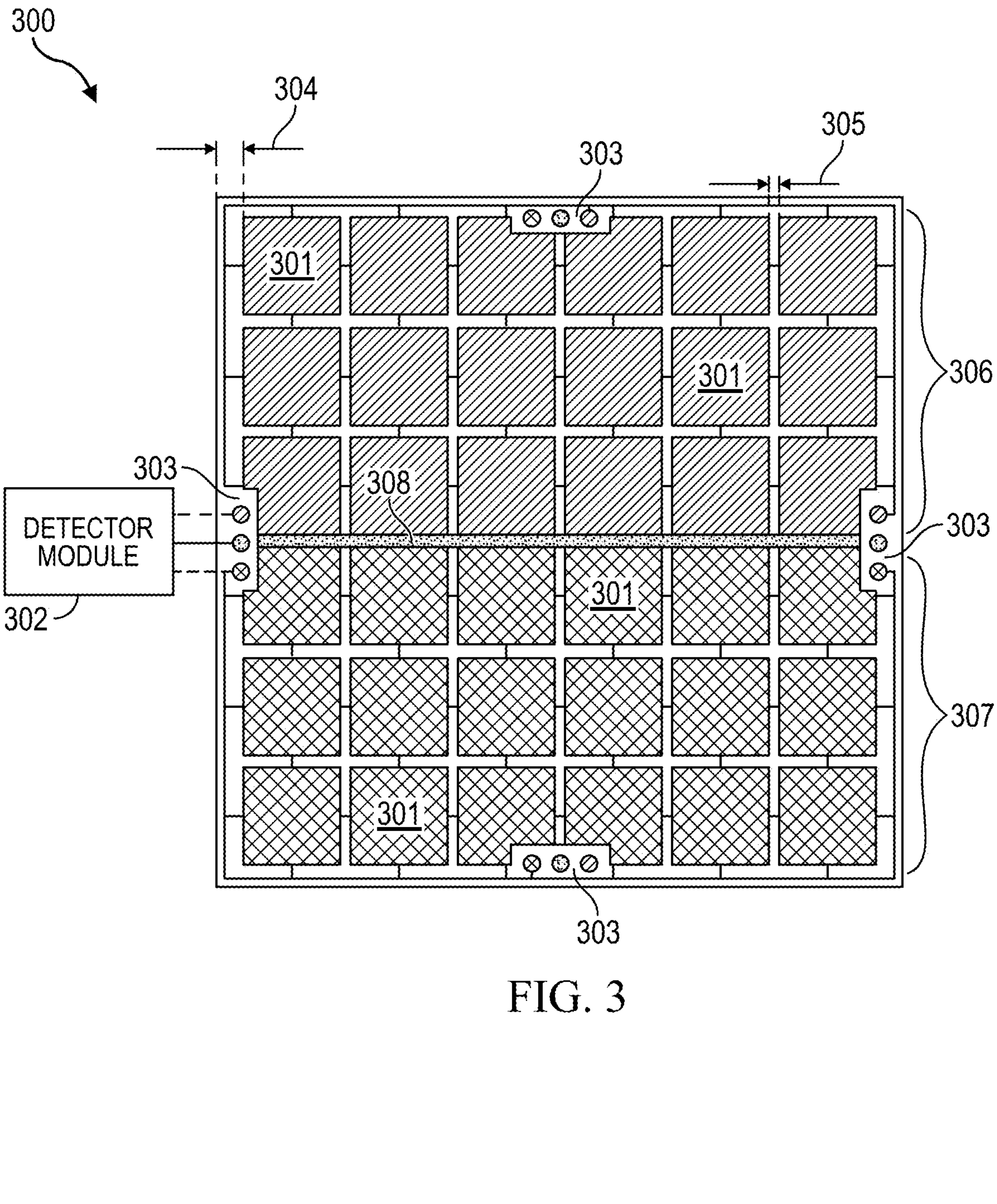

FIG. 3 illustrates a fully composed single sensor sheet having sensor tiles and attached to a detector module.

Figure 4:
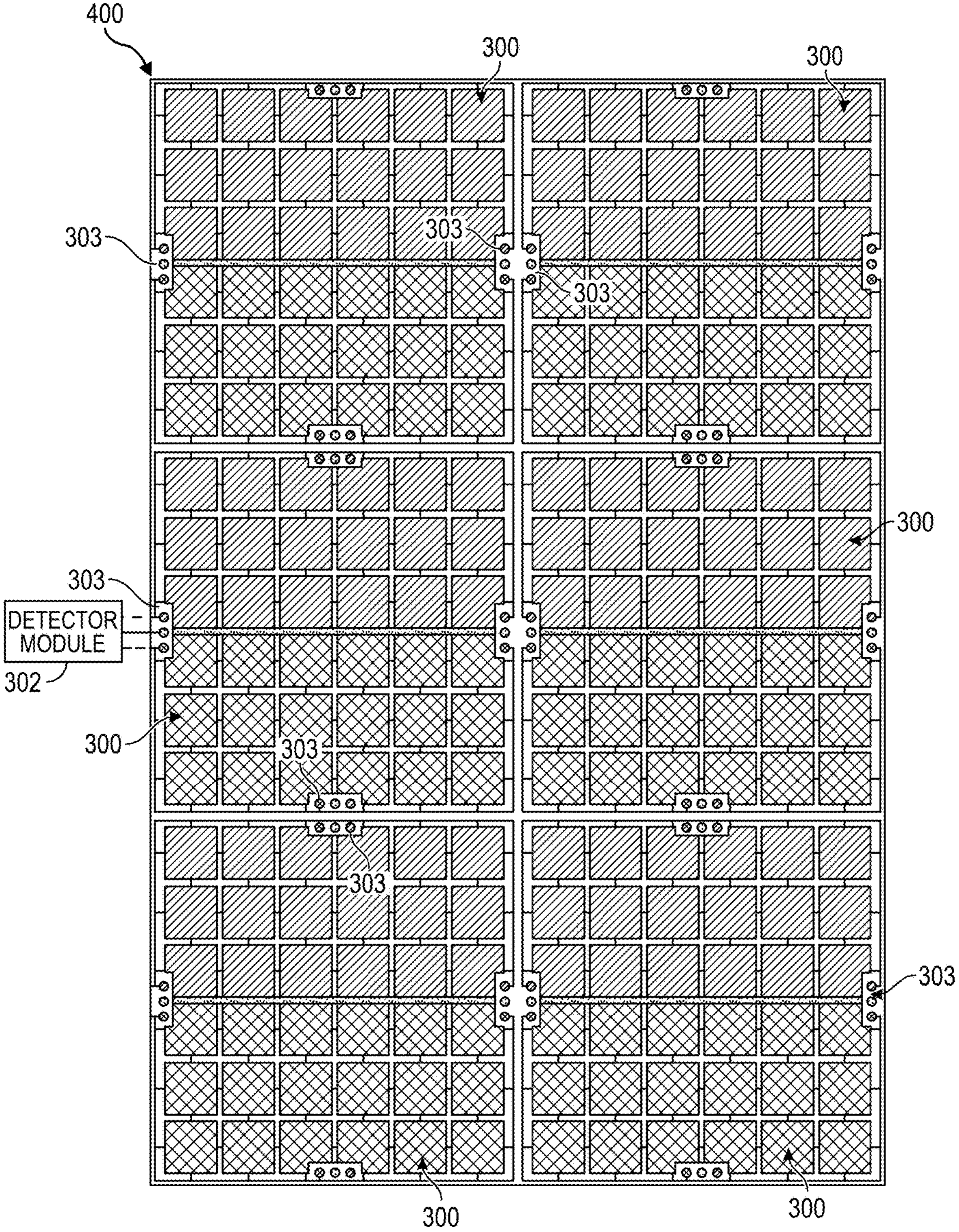

FIG. 4 illustrates an embodiment wherein several flex leak sensor sheets shown in FIG. 3 are combined to compose a larger sheet.

Figure 5:
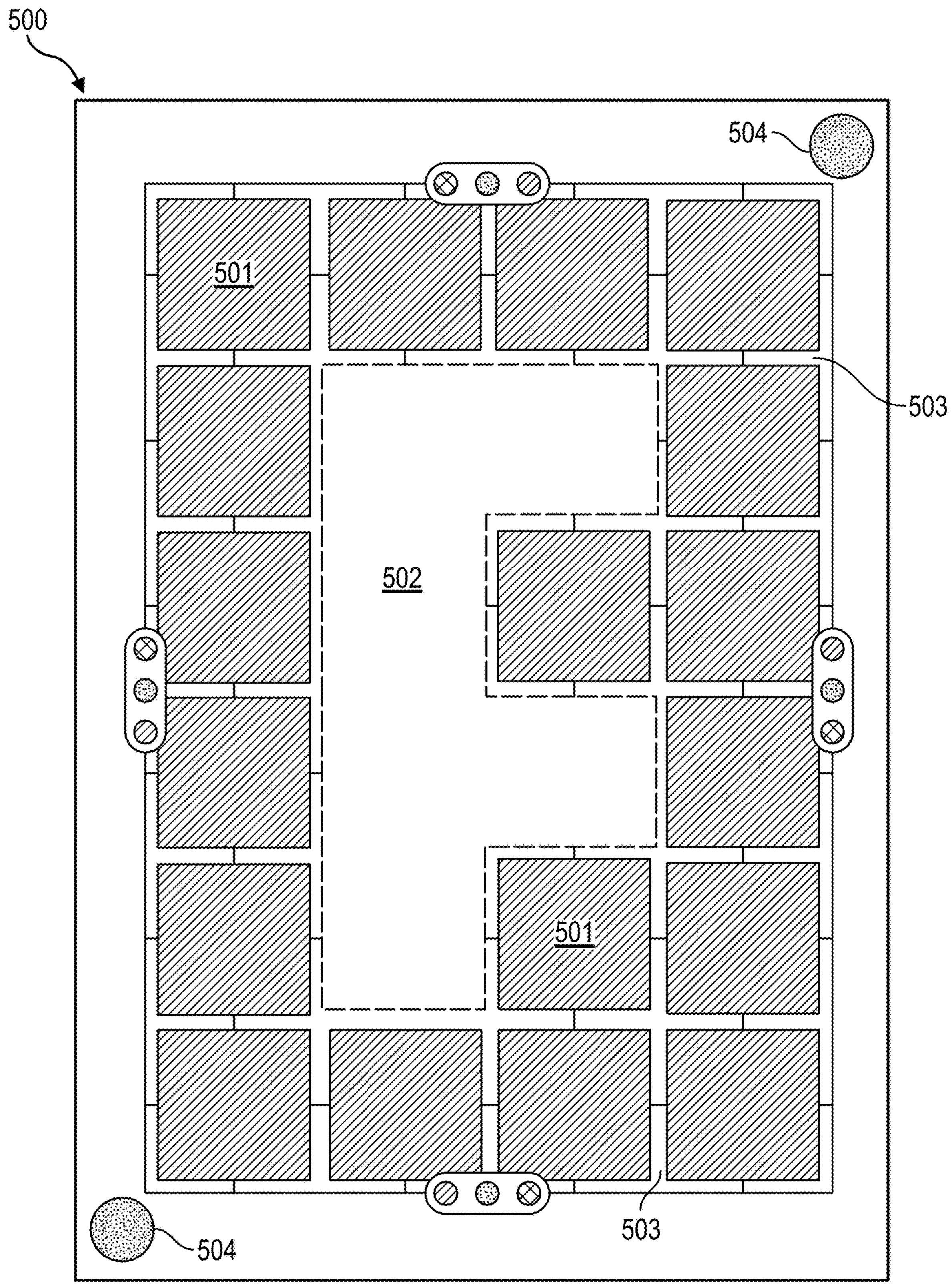

FIG. 5 illustrates how rapid custom fabrication can be achieved using a generic flex leak sensor sheet.

Figure 6:
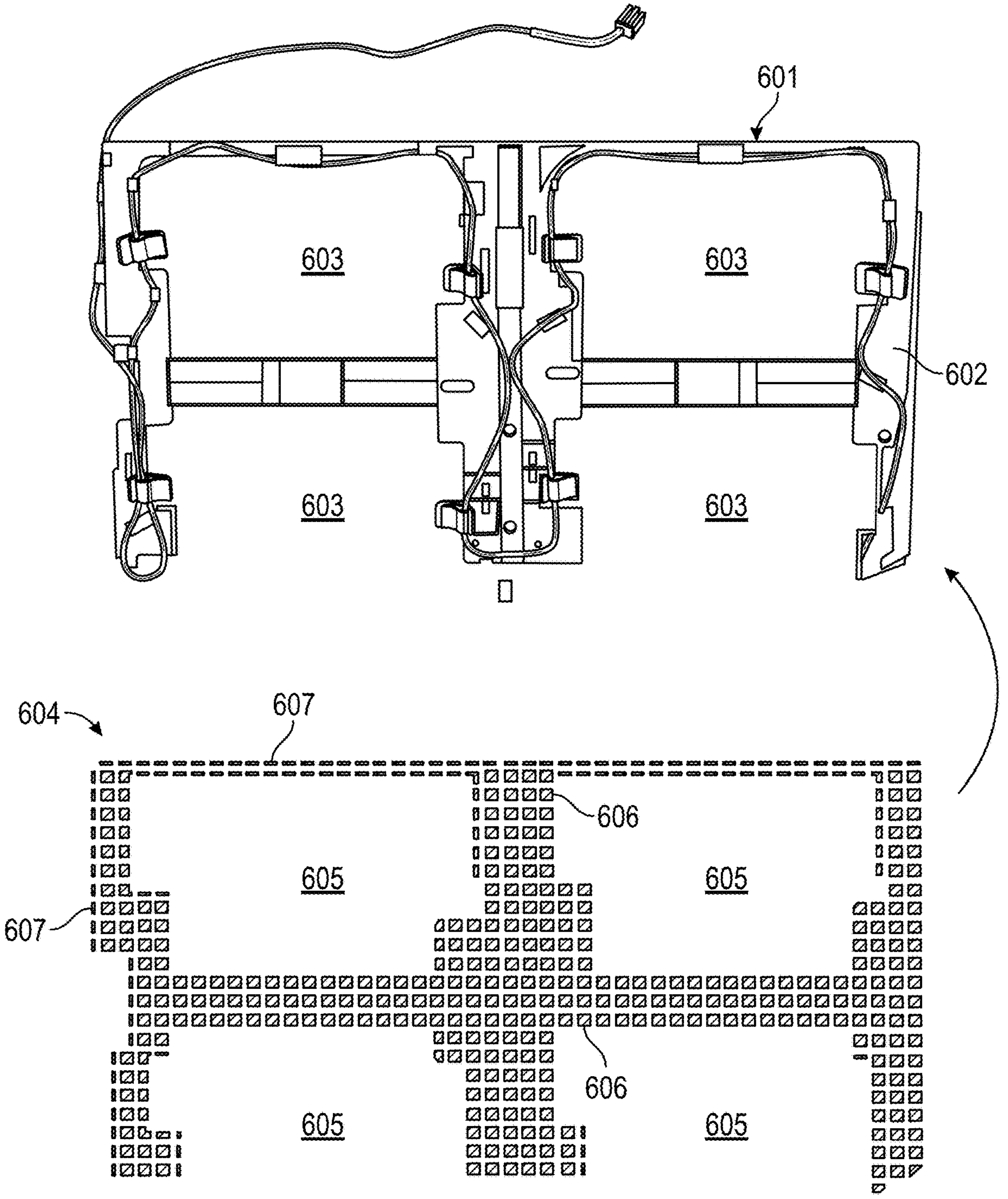

FIG. 6 illustrates rapid custom fabrication for components with complex shapes.

Figure 7:
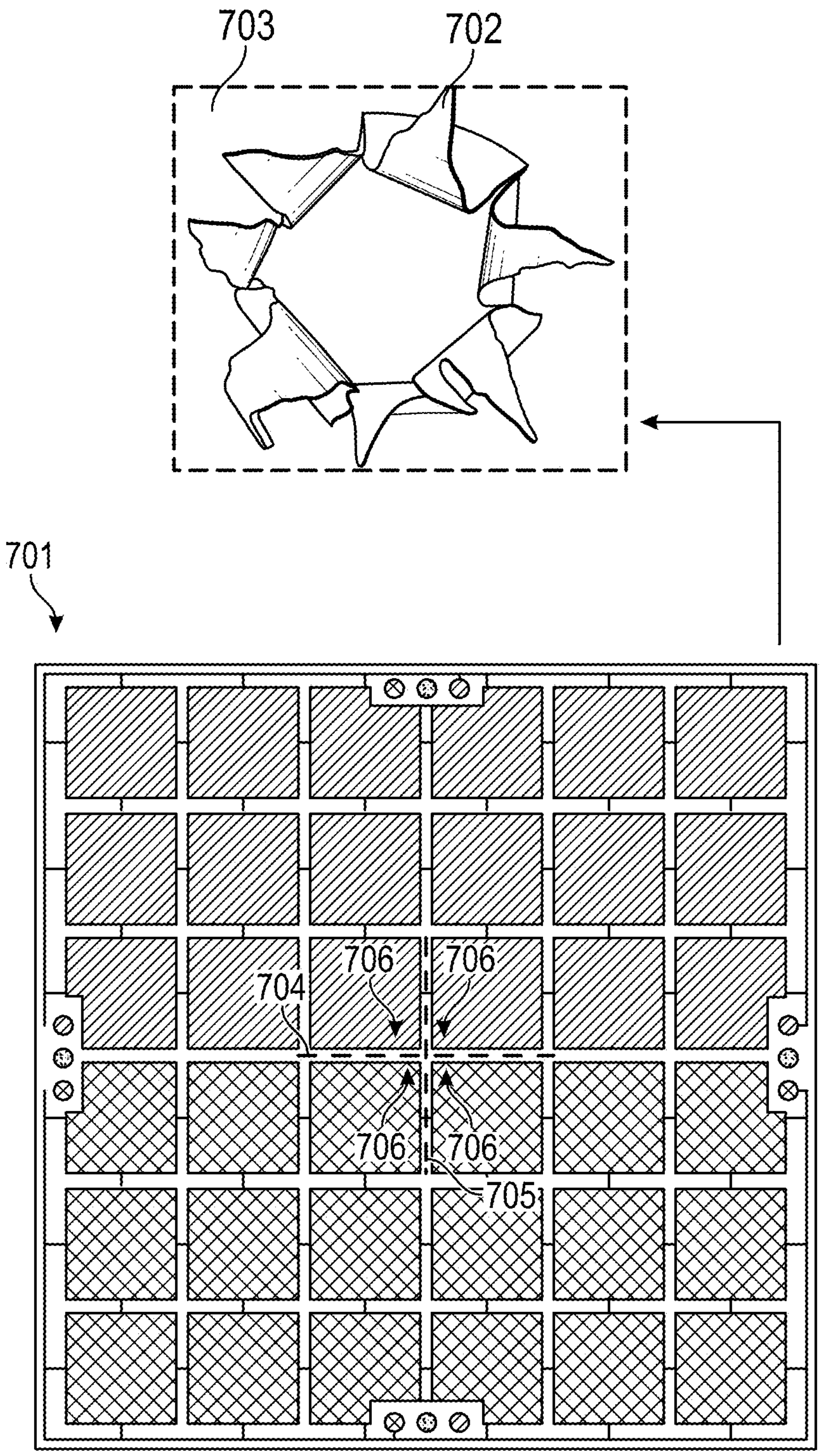

FIG. 7 illustrates using a flex leak sensor sheet 701 to conform to a three-dimensional shape using strategic cuts.

Figure 8:
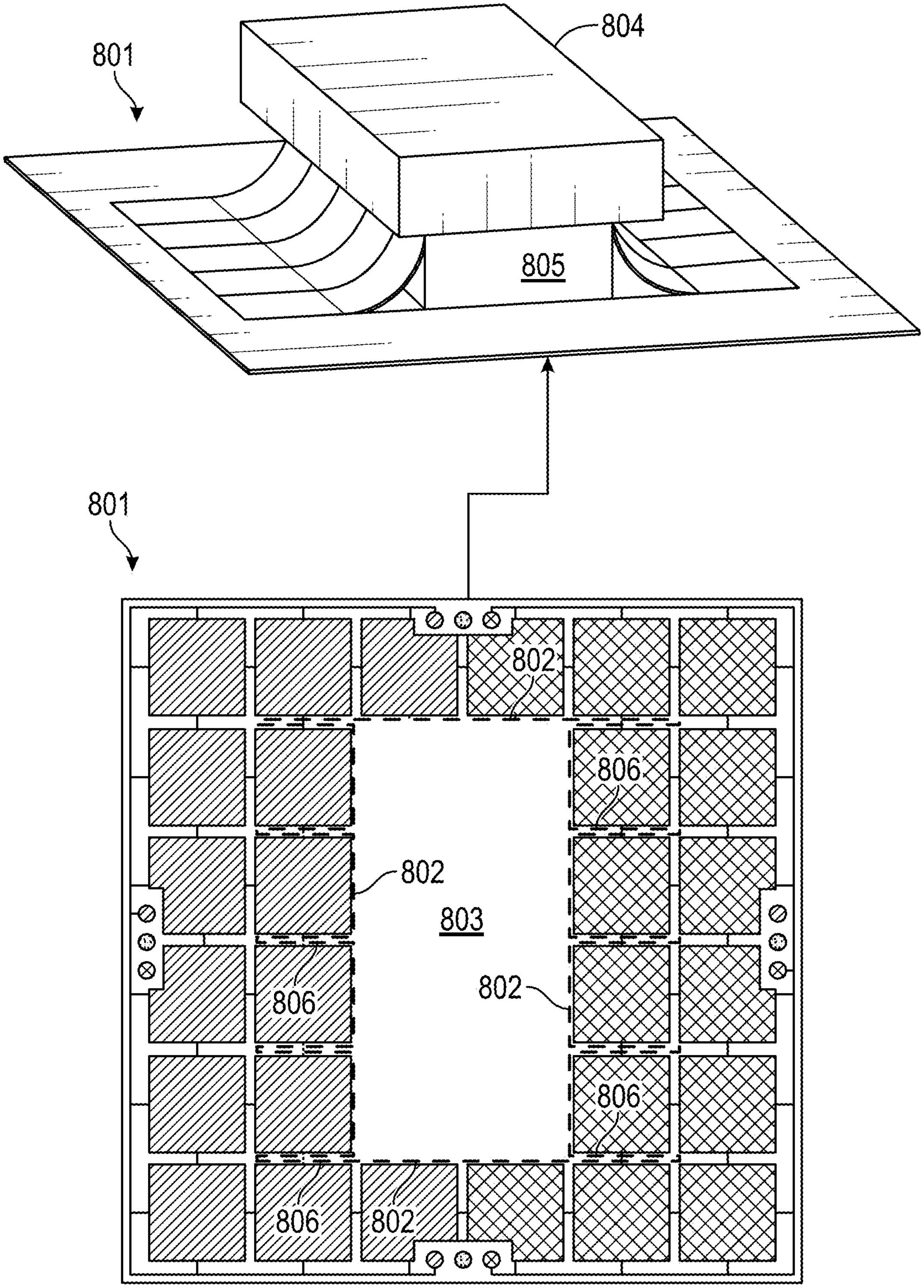

FIG. 8 illustrates another example of using a flex leak sensor sheet to conform to a three-dimensional shape using strategic cuts to form an open area.

Figure 9:
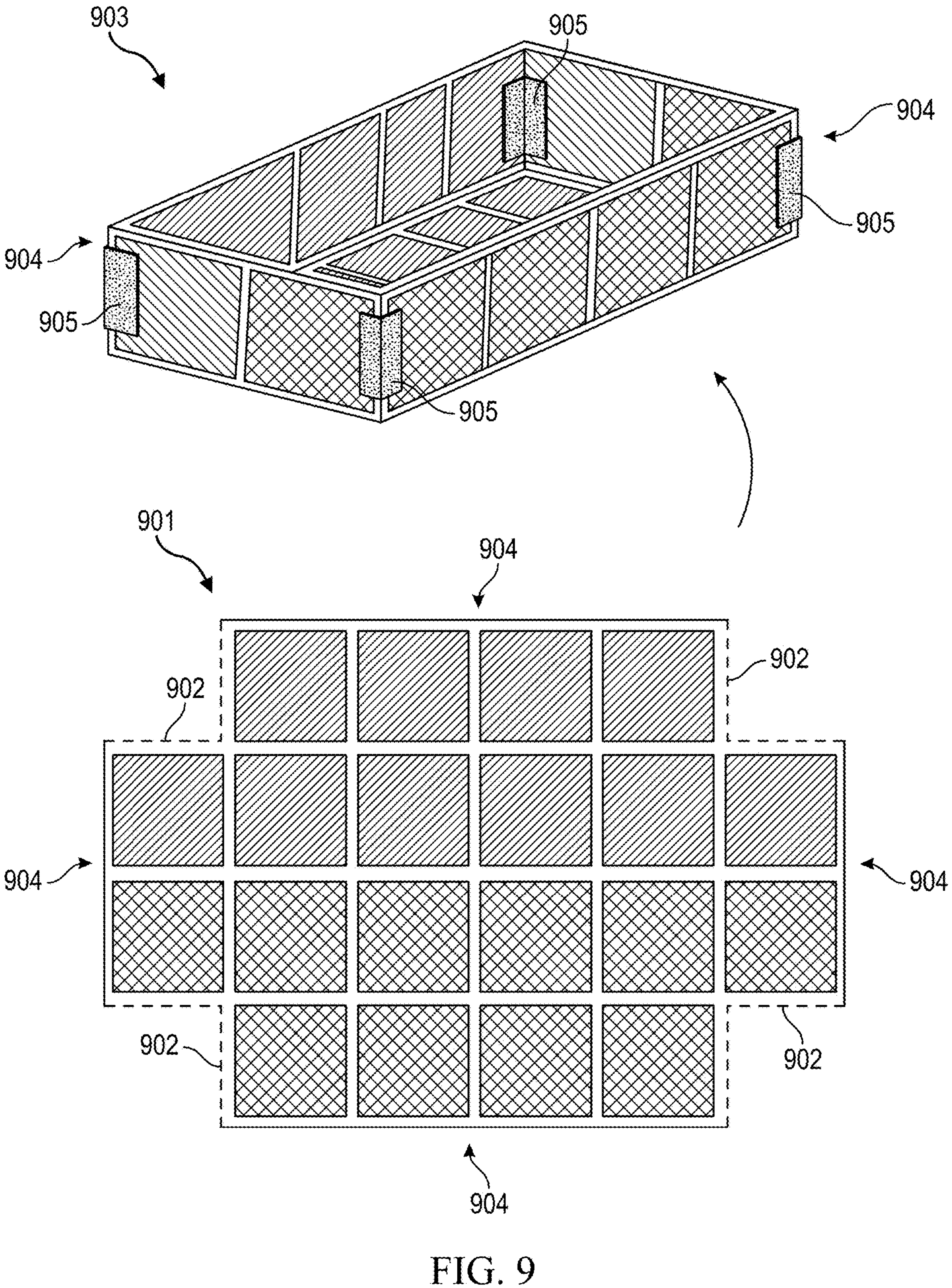

FIG. 9 illustrates a flex leak sensor sheet that provides both sensing and structural benefits.

Figure 10:
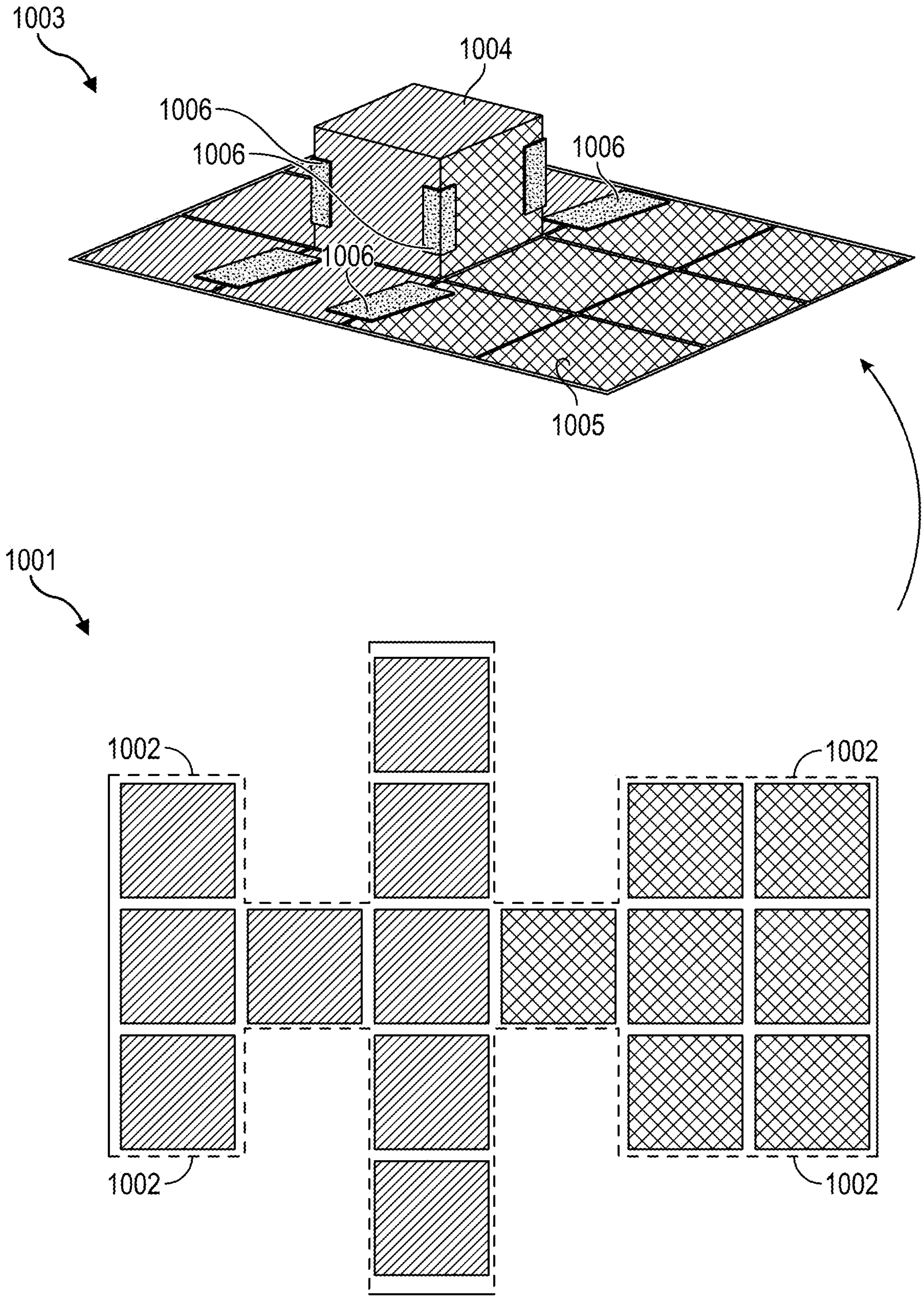

FIG. 10 illustrates a flex leak sensor sheet that provides both sensing and shielding benefits.

Figure 11:
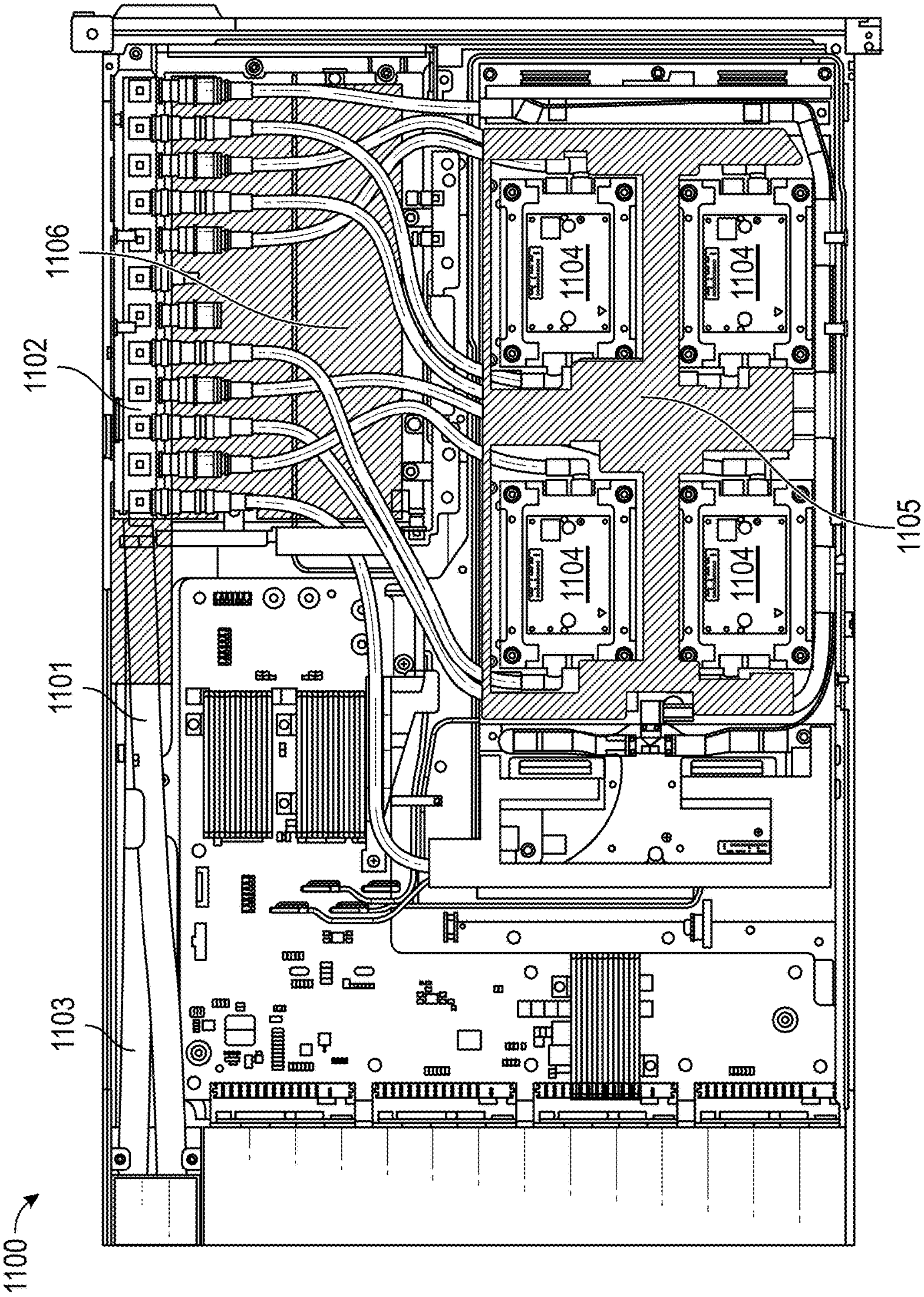

FIG. 11 shows the interior of a chassis that uses flex leak sensor sheets to detect leaks.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates components of a liquid cooling system for an individual rack 101. Rack 101 typically has a frame structure comprising top and side panels along with side rails or brackets for mounting components. Those structural elements are well known but are not shown in FIG. 1 to simplify the illustration. As utilized herein, the term "rack" 101 refers to a physical rack having multiple chassis receiving rails for receiving specific sizes of information technology (IT) nodes, such as server modules, storage modules, and power modules. The term node generally refers to each separate unit inserted into a one Rack Unit (1 U) or other height rack space within the rack. A rack unit, U or RU as a unit of measure, describes the height of electronic equipment designed to mount in a 19-inch rack or a 13-inch rack. The 19 inches (482.60 mm) or 13 inches (584.20 mm) dimension reflects the horizontal lateral width of the equipment mounting-frame in the rack including the frame; the width of the equipment that can be mounted inside the rack is less. According to current convention, one rack unit is 1.75 inches (44.45 mm) high. In one embodiment, operational characteristics of the various IT nodes can be collectively controlled by a single rack-level controller. However, in the illustrated embodiments, multiple nodes can be arranged into blocks, with each block having a separate block-level controller that is communicatively connected to the rack-level controller.

Rack 101 comprises a plurality of server chassis 102 stacked vertically and mounted on rails within the frame. Individual server chassis 102 are cooled using liquid cooling. As illustrated by the figures and described herein, chassis 102 may include multiple processers, servers, or IHSs (referred to herein as server nodes). For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), graphics processing unit (GPU), or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Rack 101 includes an inlet coolant manifold 103 for distributing cooled liquid from the primary cooling circuit 109 to server chassis 102. An outlet coolant manifold 104 receives warmed coolant from chassis 102 after the liquid absorbs heat from components in the chassis 102. The inlet manifold 103 is coupled to each chassis 102 by an inlet tube 105 that is connected by an inlet coolant line fitting 106 on the chassis 102. Within each chassis, the coolant is distributed to cold plates attached to heat-generating components, such as CPUs and GPUs, which absorb heat from the component and transfer the heat to the coolant.

The outlet manifold 104 is fluidly coupled to each chassis 102 by an outlet tube 106 carrying warmed fluid. Outlet tubes 106 are connected by an outlet coolant line fitting 108 on the chassis 102. Thus, inlet manifold 103 and outlet manifold 104 enable the cooling of multiple chassis 102 using a central cooling source, such as a cooling distribution unit (not shown), that feeds cooling fluid to rack 101 via a cooling circuit 109. The central cooling source may cool multiple racks 101, such as an entire row or section of a data center.

Although the server chassis 102 are shown as being connected to manifolds 103, 104 by tubes 105, 107, it will be understood that the smart liquid cooling manifold disclosed herein will work with other manifold configurations. For example, the Open Compute Project 21 standard (OCP21) will require blind mating for the IHS couplers and manifolds in the liquid cooling system. While this will increase the overall complexity of the liquid cooling system, the smart liquid cooling manifold will work with any liquid cooling system manifold configuration.

Certain aspects of the disclosure then relate to liquid-cooled nodes and the functionality associated with these individual nodes or chassis. As one design detail/aspect for the present innovation, consideration is given to the fact that extreme variations can exist in server/power/network topology configurations within a rack 101. In addition to dimension variations, the thermal requirements for heat-generating functional components for power, control, storage and server nodes can be very different between types or vary according to usage. These variations drive corresponding extreme diversity in port placement, fitting size requirements, mounting locations, and manifold capacity for a liquid cooling subsystem. Further, a chassis of each node is typically densely provisioned. Lack of space thus exists to mount a discrete water distribution manifold in high-power racks. The present disclosure addresses and overcomes the challenges with detecting liquid cooling fluid leaks throughout a rack having nodes with a large number of variations in distribution components.

Leak collection structures are positioned within chassis 102 to receive and detect cooling liquid that leaks from the liquid cooling subsystem. Liquid sensors detect a presence of leaked cooling liquid in the leak collection structures. A leak detection subsystem responds to a detected presence of liquid by providing a leak indication.

Based on portions of the chassis 102 that can be exposed to the leak, a Liquid Infrastructure Management Controller (LIMC) implements a leak detection solution to avoid or mitigate damage to computing components. The leak detection solution can provide an indication of where the leak is detected. The leak detection solution can cause shutoff of a portion of the liquid cooling subsystem that is leaking. The leak detection solution can escalate the shutoff to a block level or a rack level based on the rate of the leak or the leak overspilling one liquid cavity sensed by one liquid sensor and cascading to another liquid cavity sensed by another liquid sensor. The intervals between triggering each liquid sensor is related to a volume rate of the leak and thus a severity level of the leak.

In previous configurations, a leak sensor, such as a leak sense board or a leak detector rope, may be placed within chassis 102 in areas where a coolant leak may occur, such as around the base of a cold plate for a processor. The leak sensor is used to detect leaked cooling liquid. A leak sensor may determine that a leak has occurred based on a change in electrical properties of the sensor. For example, if the leak sensor detects a leak within a chassis 102, the resistance of the leak sensor may change.

Existing leak detection systems use conduction and require direct contact with liquid. Although this is a proven technology that works well, it has shortcomings. Every leak sense board requires a custom design, which complicates adoption. This can result in only CPUs being equipped with leak sensors since GPUs come in too many varieties and shapes. Each leak sense board requires a new PCBA spin, custom part number, part validation, firmware, platform attach point, and mechanical assembly validation. This causes substantial logistical challenges with fabrication and installation that add friction and delay to new platforms. Additionally, for sensors such as leak detection ropes coverage is limited, so that it senses only a small area directly near the cold plate. As a result, fluid can bypass leak detection if the coolant does not pool in the correct location.

The disclosed technology addresses leak detection challenges by introducing a scalable and composable flex leak sensor sheet. This solution leverages a large sheet of leak sensing tiles. The individual tiles have a generic geometric shape, such as a square or rectangle, that repeats across the sheet. The flex leak sensor sheet design allows for quick prototyping and adaptation to new leak-detection projects or platforms. The sheet may be easily and quickly cut to desired shapes for testing and evaluation. Once validated, the shapes can be reused across multiple platforms. Successful shapes are easily repeatable through die-cutting. The sensor sheet is bendable, foldable, and mechanically tolerant thereby enabling almost any cutout shape to function effectively and allowing the sensor sheet to conform to various shapes and sizes. Additionally, individual sheets can be connected together to form larger composite structures, providing extensive coverage and enhanced leak detection capabilities on larger projects. The term “composable” as used herein refers to the ability of the sensor sheets to be combined or assembled in various configurations to form a larger, integrated system. This means that individual sensor squares or tiles can be connected together to create a larger sensing surface, which can be customized to fit different shapes and sizes as required by the specific application. The composable nature of the sensor sheets allows for flexibility in design and scalability, enabling the creation of complex, tailored solutions without the need for custom designs for each new use case.

FIG. 2 illustrates an example flex leak sensor sheet 200 comprising an n×m array of sensor tiles 201. Each sensor tile 201 on sensor sheet 200 is coupled to the adjacent sensor tile 201 that are located above, below, or to either side. Although FIG. 2 shows a 4×6 array of tiles 201, it will be understood that the sensor sheet 200 may have any number of rows and columns.

Sensor sheet 200 includes a connector 202 on each edge. The connectors 202 may be used connect to two or more sensor sheets 200 together to create a larger sheet. The connectors 202 may be, for example, right angle board-to-board or mezzanine connectors that allow for easy connections between sensor sheets 200. The connectors 202 may have a consistent male or female designation on each side that ensures that sensor sheets 200 are connected in a desired orientation. For example, the top and left side connectors 202 may be male while the bottom and right side connectors 202 are female. Connectors 202 also provide a connection to a sensor module that drives the sensor sheet 200 and detects resistance changes that indicate when a leak occurs.

FIG. 2 also shows an expanded view of sensor tile 201*a*. Each sensor tile 201 employs passive circuitry traces 203, 204 on a flexible Printed Circuit Board (PCB) 205. The traces 203, 204 form a redundant “tree” or “web” on the sensor tile 201. One set of traces 203 is formed on the top side of flexible PCB 205, and the other set of traces 204 is formed on the back side of flex PCB 205, which may act as a ground plane. In other embodiments, traces 203 and 204 may be formed on the same side of the flexible PCB 205. Both sets of traces have external connections 206 on all four sides to adjacent sensor tiles 201. This allows three of four sides of a sensor tile 201 to be cut and still provide a signal to the sensor sheet. The trace pattern is replicated across all individual sensor tiles 201. The orthogonal branches in traces 203 and 204 make bending easier with no preferred direction. The layout of traces 203 and 204 make sensor tile 201 highly tolerant to failure. If mechanical stress causes some traces to break, then redundant connections will keep the remaining traces working. Additionally, other polygon shapes are possible both for the sensor tile shape and for the layout of traces 203 and 204, such as triangle, hexagon, etc. Traces 203 and 204 may be formed using any appropriate corrosion-resistant surface finish, such as, for example, Electroless Nickel Immersion Gold (ENIG), Hot Air Solder Leveling (HASL), Immersion Tin, or Immersion Silver, Electroless Nickel/Immersion Palladium/Immersion Gold (ENIPIG). The technology used for the traces 203, 204 may be selected based on device requirements, such as environmental conditions, mechanical durability, and cost considerations.

The flex leak sensor sheet 200 and sensor tiles 201 are designed to be cut, which allows for quick prototyping and installation. The sensor sheet 200 will work with almost every cutout shape. Quick-design die cuts can be adapted to a new project or platform. This approach allows designers to respond rapidly to market demands and to add leak protection to a chassis even when the mechanical shape of the thermal solution is out of the designer’s control and/or cannot be anticipated. The design of each sensor tile 201 is mechanically tolerant, which makes sensor sheet 200 bendable and foldable. Sensor sheet 200 is also composable wherein multiple sheets 200 can be connected together. Sensor sheet 200 can be deployed in a flat detection-only configuration, or the sensor sheet 200 can be bent and formed into a tray or trough for leak containment in addition to detection. In cases where folding is not required, the flexible PCB 205 may be replaced with thin, rigid PCB which is typically a lower cost option.

The design of flex leak sensor sheet 200 is tolerant to parts of a square 201 being cut and thereby inactivated, such as for the convenience of matching a sheet 200 to a particular physical shape (e.g., as noted below in FIGS. 5-11). The use of flex leak sensor sheet 200 accepts the limitation that a small part of the sheet may be inactivated due to cutting so that the sheet 200 will fit a particular application. While the small part of the sheet might not be capable of leak detection, the larger portion of the sheet 200 remains functional.

As noted above, the flex leak sensor sheet 200 may be formed as any array of size n×m. The overall dimensions of sensor sheet 200 will depend on the dimensions of the sensor tiles 201 used in the array. In some configurations, the dimensions of sensor tiles 201 may be on the order of one centimeter on each side. In other configurations, where finer detail is needed the dimensions of sensor tiles 201 may be on the order of a few millimeters on each side.

FIG. 3 illustrates a fully composed single sensor sheet 300 having sensor tiles 301. The sensor sheet 300 is driven by a detector module 302, such as an LIMC. Sheet 200 is a 6×6 array of sensor tiles 301, which is a building block that can be sized to fit common flex panels and that can be expanded on all edges to create larger sheet. Connectors 303 on each side may be used to couple sensor sheet 300 to similar sensor sheets. Any of the connectors 303 may be used to couple detector module 302 to the sensor sheet 300. The firmware in detector module 302 can handles one sensor tile 301 or thousands of tiles 301 in linked sheets 300.

As noted above, the sensor sheet 300 can be cut to any size and shape to fit the bottom of a chassis for leak detection (i.e., cut or trimmed to fit under or around CPUs, GPUs, or other IHS components). In other configurations, the borders widths 304 of the sensor sheet 300 and the size of the gaps 305 between sensor tiles 301 can be minimized to avoid blind spots in leak detection.

Sensor sheet 300 has two separate zones 306 and 307 that detect leaks independently. Any sensor tile 301 can trigger a leak detection. However, detector module 302 monitors zones 306 and 307 separately and can apply humidity and temperature compensation. A barrier 308 separates zones 306 and 307 so that liquid leaking on one zone does not spread to the other zone. Barrier 308 may be any structure that prevents or discourages liquid from crossing between zones 306 and 307. For example, a silk screened line, solder mask, or overlay may be applied to sensor sheet 300 to form a barrier 308.

FIG. 4 illustrates an embodiment wherein several flex leak sensor sheets 300 (FIG. 3) are combined to compose a larger sheet 400. Although sensor sheet 400 is shown as just a larger rectangle, it will be understood that the individual sensor sheets 300 may be combined in any way to construct any desired shape. Once sensor sheet 300 has been shown to operate properly, then no additional board design is required to form the larger sheet 400 comprising multiple sensor sheets 300. The connectors 303 on sheets 300 are arranged so that multiple sheets can be combined easily. For example, the left side connectors 303 may all be male RA B2B connectors, and the right side connectors 303 may all be corresponding female RA B2B connectors to ensure a proper orientation of individual sheets 300 within larger sheet 400. Instead of using detachable connectors 303, sheet 400 can be made more durable by permanently bonding connectors 303 such as by using hot bar soldering.

FIG. 5 illustrates how rapid custom fabrication can be achieved using a generic flex leak sensor sheet, is similar to sensor sheet 200 (FIG. 2) with a 4×6 array of sensor tiles 501. Sensor sheet 500 shows how some sensor tiles can be removed to be adapted to fit a particular chassis, IHS, or other component for leak detection. As shown in FIG. 5, six sensor tiles have been removed from sensor sheet 500 to create an opening 502. The individual sensor tiles 501 are spaced apart with small guard bands 503 that provide cutting tolerances. The connections between the sensor tiles 501 are redundant (i.e., connections to all adjacent tiles); however, no “islands” are allowed. Each sensor tile 501 must have a path back to a connector that is coupled to the detector module.

The sensor sheet array 500 may have tooling holes 504 in corners for die cutter registration. This allows for repeatable complex cutouts 502 in sheet 501 using only a die cutter. The size of the sensor tiles 501 may be made small for a higher resolution shape to fit around any component. In some embodiments, cuts between sensor tiles 501 can also be made for to enable folding of sheet 500 to create three-dimensional shapes.

FIG. 6 illustrates rapid custom fabrication for components with complex shapes. Component 601 has a complex shape with a frame portion 602 that defines several different open areas 603. A sensor sheet 604 has been cut to fit frame 602. Sensor sheet 601 has several open areas 605 that generally match the outline of open areas 603 on frame 602. The cut sensor sheet 604 can be placed on top of component 601 without interfering with additional components that are attached on frame 601 and/or mounted in openings 603.

Before cutting, sensor sheet 604 may be a single large sheet or maybe a composite sheet created by joining smaller sensor sheets. FIG. 6 illustrates how the cuts can be made anywhere on the sensor sheet 604 so that some sensor tiles 606 remain whole while other sensor tiles 607 are cut into to smaller pieces to fit the frame 602. It may be preferred to avoid cutting through the sensor tiles 607 (i.e., better to cut between tiles); however, as illustrated in FIG. 6 cutting between tiles is not required. Once a preferred configuration of the cut sensor sheet 604 is selected, that configuration can be repeated by die cutting additional sensor sheets to the same shape.

FIG. 7 illustrates using a flex leak sensor sheet 701 to conform to a three-dimensional shape using strategic cuts. The sensor sheet 701 can be custom fit to a vertical deformation 702 on a chassis 703 or other surface. The deformation 702 may be a hole or puncture as shown in FIG. 7. In other configurations, the deformation 702 may be a discrete component (e.g., a capacitor or inductor) or a hose or cable. Two intersecting straight cuts 704, 705 can be made in sensor sheet 701 to create a small opening. The cut corners 706 may be folded up to create an opening to fit around deformation 702, the corners 706 can then be tucked back in to close gaps around the deformation 702.

FIG. 8 illustrates another example of using a flex leak sensor sheet 801 to conform to a three-dimensional shape using strategic cuts 802 to form an open area 803. The sensor sheet 801 can be custom fit around components that have a smaller base than a top. For example, CPU 804 is mounted on cold plate 805. CPU 804 overlaps the cold plate 805. Opening 803 is cut in sensor sheet 801 by removing sensor tiles from the middle of the sheet. The rectangular cutout 803 fits over the CPU 804 and then fits around the base of cold plate 805. Some additional cuts 806 are made between the remaining sensor tiles to create flexible tabs that clear the wider top 804. These tabs can then be tucked back in to close gaps against the cold plate 805.

In one configuration, the flex leak sensor sheet 801 is installed as the last step of an assembly process. The sensor sheet 801 is pushed down on top of CPU 804. The tabs open to pass CPU 804 and cold plate 805, then close against the body of cold plate 805 for a tight seal. The flex leak sensor sheet 801 may be insulated so that it can cover nearby circuitry around CPU 804.

FIG. 9 illustrates a flex leak sensor sheet 901 that provides both sensing and structural benefits. Sensor tiles on the corners of sensor sheet 901 have been removed by cutting along lines 902. Sensor sheet 901 is then folded to create a tray 903. The outer rows 904 of sensor tiles on sheet 901 are folded up to form the sides of tray 903. The sides provide containment for any liquid that drips or leaks into tray 903. The outer rows 904 of sheet 901 are joined together using, for example, an adhesive backed wicking felt tape.

FIG. 10 illustrates a flex leak sensor sheet 1001 that provides both sensing and shielding benefits. Sensor sheet 1001 is cut along lines 1002 to remove some of the outer rows of sensor tiles. The remaining sensor tiles can be folded to form a new structure 1003 with a hollow box portion 1004 that extends above a floor portion 1005. An adhesive backed wicking felt tape 1006 may be used to join the loose edges of sensor sheet 1001 together so that the new structure 1003 holds its form. The floor portion 1005 of the structure 1003 may fit over a PCB, for example, with the box portion 1004 positioned to shield components on the PCB. For example, high voltage components or sensitive circuitry may be protected by box 1004 so that leaking fluid is unable to reach the component while still providing leak detection capability. The protected component in box 1004 will not be exposed to splashing due to leaks, electric fields, or magnetic fields while allowing leak sensing on all sides of the component.

FIG. 11 shows the interior of a chassis 1100 that uses flex leak sensor sheets to detect leaks. Some components of chassis 1100 are liquid cooled. An input line 1101 provides external coolant to a chassis manifold 1102, which further distributes coolant to components within chassis 1100. Warmed liquid is returned from those components to manifold 1102 and then routed to an external cooling system via outlet line 1103. Coolant from manifold 1102 may supply cold plates 1104 on which GPUs may be mounted. A flex leak sensor sheet 1105 is cut to fit around the cold plates and under any GPUs mounted thereon. The sensor sheet 1105 provides greater coverage and sensitivity than prior systems, such as leak detect ropes that might be strung between the cold plates 1104. The flex leak sensor sheet 1105 may be cut into any appropriate pattern and placed around cold plates 1104 to ensure maximum coverage. The sensor sheet 1105 may be connected to an LIMC or other detector module (not shown) either in chassis 1100 or in the rack on which chassis 1100 is mounted. An additional sensor sheet 1106 may be placed in the manifold 1102 drip tray to detect failures in the internal coolant line connectors.

In some chassis designs, multiple cold plates may have the same form factor. A standardized flex leak sensor sheet may be used for each cold plate for that design. This allows for sensor sheets to be easily repeatable using die cutting so that once validated for a particular chassis layout, the sensor sheets can be quickly produced for similar chassis.

In various embodiments a conduction sensing tile, which may have a square, rectangle, or other suitable polygon shape, is adapted for leak detection. The sensing tile has a unique design that is low cost, highly interconnectable, highly resilient against severing, bendable, and conformable to arbitrary shapes and wherein damage to the sensing tile is severable (i.e., damage to sheet is unlikely to prevent leak detection). A sheet of the sensing tiles can be driven by a single controller. The sensing sheet can be scaled up to arbitrary size, thereby forming a surface that is composed of copies of itself. A composed sensing surface can have an arbitrary shape cut out of it so long as the remaining squares form a contiguous connected matrix and all cuts are limited to only the single connection between sensing tiles.

The composed sensing surface permits cuts anywhere with no substantial degradation to detection characteristics. The composed sensing surface may use strategic cuts to conform to a three-dimensional design, such as wrapping around hose or component. The composed sensing surface is foldable into a concave tray structure for containing leaks. The composed sensing surface may also be folded into a convex shield structure for: protecting against two different modalities: physical splashes and electric fields, while simultaneously sensing for leaks.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. An apparatus for leak detection, comprising:

a sensor sheet composed of a plurality of sensor tiles arranged in a matrix pattern;

each sensor tiles comprising a first set of traces interleaved with a second set of traces, wherein the first and second sets of traces are arranged in a pattern providing multiple connections to adjacent sensor tiles, thereby ensuring functionality even if some traces are damaged; and a plurality of connectors on multiple sides of the sensor sheet, the connectors adapted to be coupled to another sensor sheet or to a leak detector.

2. The apparatus of claim 1, wherein the sensor sheet is bendable and foldable allowing it to conform to various shapes and sizes while maintaining functionality of the sensor tiles.

3. The apparatus of claim 1, wherein the first and second set of traces comprise Electroless Nickel Immersion Gold (ENIG) plated copper traces on a flexible Printed Circuit Board (PCB).

4. The apparatus of claim 1, with the first set of traces is located on the top side of a flexible Printed Circuit Board (PCB) and the second set of traces is located on the back side of the flexible PCB.

5. The apparatus of claim 1, wherein the sensor sheet is configured to be scalable and composable to form larger composite structures by connecting multiple sensor sheets together.

6. The apparatus of claim 1, wherein the first set of traces and the second set of traces are configured to detect the presence of liquid by changing electrical properties when in contact with the liquid.

7. The apparatus of claim 1, wherein the sensor tiles are configured to be cut on three sides while still maintaining electrical connectivity and functionality through the redundant connections.

8. The apparatus of claim 1, wherein sensor tiles are removed from corners of the sensor sheet, and wherein remaining sensor tiles on edges of the sensor sheet are folded to create a concave tray structure.

9. The apparatus of claim 8, wherein the tray is configured to contain liquid and to detect liquid.

10. The apparatus of claim 1, wherein select sensor tiles are removed from the sensor sheet so that the sensor sheet is configured to be folded into a convex structure.

11. The apparatus of claim 10, wherein the convex structure is a box.

12. The apparatus of claim 10, wherein the convex structure is adapted to protect components from liquid and electric fields while simultaneously sensing for leaks.

13. The apparatus of claim 1, wherein the flexible PCB includes a ground plane between the first and second set of traces.

14. The apparatus of claim 1, wherein the sensor sheet connectors are right angle board-to-board connectors.

15. A leak detection system, comprising:

a sensor sheet comprising a plurality of sensor tiles arranged in a matrix pattern and a plurality of external connectors arranged around a periphery of the sensor sheet, the sensors tile having redundant connections on multiple sides to other sensor tiles; and a detector module coupled to the sensor sheet by one of the external connectors, the detector module configured to drive and read the sensor sheet.

16. The system of claim 15, wherein the sensor tiles are divided into a first group and a second group, and the sensor sheet further comprises a barrier between the first group and the second group, wherein the barrier is configured to prevent liquid from migrating from the first group to the second group.

17. The system of claim 16, wherein the detector module is configured to compensate for humidity or temperature or both by comparing signals from the first group of sensor tiles and the second group of sensor tiles.

18. The system of claim 15, wherein corner sensor tiles are removed from the sensor sheet, and wherein peripheral ones of the sensor tiles are folded to form a concave structure.

19. The system of claim 15, wherein selected sensor tiles are removed from the sensor sheet, and wherein the sensor sheet is folded to form a convex structure.

20. The system of claim 19, wherein the convex structure forms a hollow region adapted to protect components from coolant leaks.

* * * * *